United States Patent [19]
Sweeney et al.

[11] Patent Number: 5,570,582
[45] Date of Patent: Nov. 5, 1996

[54] CRYOGENIC REFRIGERATION METHOD FOR USE IN CONNECTION WITH A CRYOGENIC TEMPERATURE SWING ADSORPTION PROCESS

[75] Inventors: Paul Sweeney, Basking Ridge; Colleen Prince, North Plainfield, both of N.J.; Andrew P. Owen, Guildford, United Kingdom

[73] Assignee: The BOC Group, Inc., New Providence, N.J.

[21] Appl. No.: 388,326

[22] Filed: Feb. 14, 1995

Related U.S. Application Data

[63] Continuation-in-part of Ser. No. 209,652, Mar. 10, 1994.
[51] Int. Cl.$^6$ ............................................. F25J 3/00
[52] U.S. Cl. .................................. 62/641; 62/924
[58] Field of Search .......................... 62/17, 18, 22, 62/40

[56] References Cited

U.S. PATENT DOCUMENTS

| | | | |
|---|---|---|---|
| 4,689,062 | 8/1987 | MacLean et al. | 62/18 |
| 4,732,580 | 3/1988 | Jain et al. | 62/18 X |
| 4,861,361 | 8/1989 | Jain et al. | 62/22 X |
| 5,159,816 | 11/1992 | Kovak et al. | 62/22 |
| 5,161,380 | 11/1992 | Cheung | 62/22 |
| 5,220,797 | 6/1993 | Krishnamurthy et al. | 62/22 |

Primary Examiner—Christopher Kilner
Attorney, Agent, or Firm—David M. Rosenblum; Larry R. Cassett

[57] ABSTRACT

A cryogenic refrigeration method for use in connection with a cryogenic temperature swing adsorption process. The cryogenic temperature swing adsorption process has a discontinuous production cycle during which production of a purified vapor stream ceases or is reduced through use of purified vapor to purge a regenerating adsorption bed. Additionally, the purified vapor stream in part of the production cycle is superheated through use of the purified vapor stream to cool the regenerating adsorption bed. A heat exchange stream is liquefied against the vaporization of at least part of an impure liquid stream to produce an impure vapor stream to be purified by the adsorption process. Process liquid is continually produced from the liquefaction of the process stream. The process liquid is used to in turn liquefy the purified vapor stream at varying flow rates that are sufficient to liquefy the purified vapor stream throughout the production cycle. When production is reduced or ceases, process liquid accumulates fiber later use in liquefying purified vapor. Although process liquid is supplemented, the requirement for the heat exchange stream, for instance nitrogen, is constant. This allows the refrigeration method of the present invention to be integrated with an air separation plant without placing undue cyclic loadings on the air separation unit thereof.

12 Claims, 1 Drawing Sheet

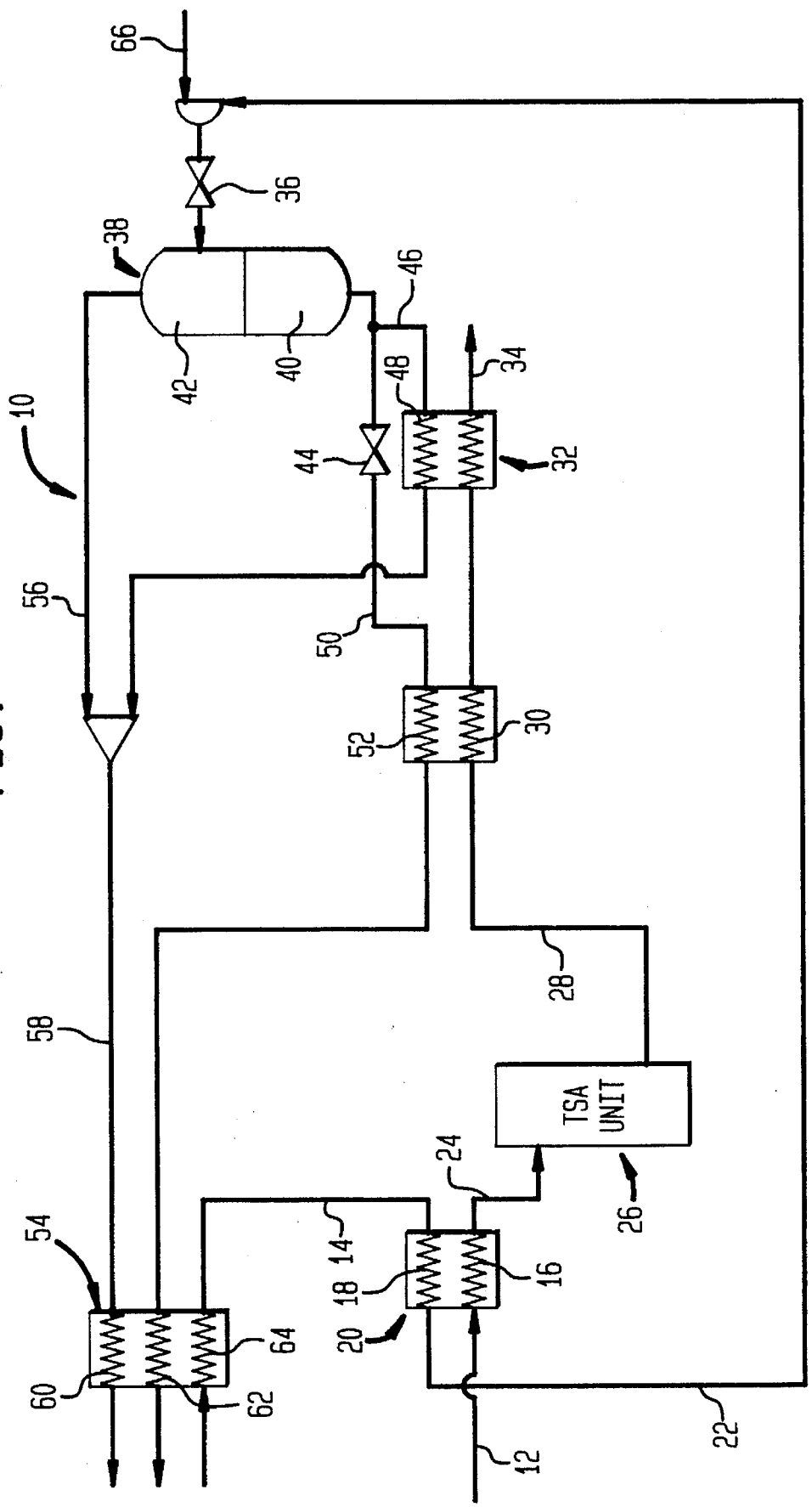

CRYOGENIC REFRIGERATION METHOD FOR USE IN CONNECTION WITH A CRYOGENIC TEMPERATURE SWING ADSORPTION PROCESS

RELATED APPLICATION

This is a continuation-in-part of application Ser. No. 08/209,652, filed Mar. 10, 1994.

BACKGROUND OF THE INVENTION

The present invention relates to a cryogenic refrigeration method for use in connection with a cryogenic temperature swing adsorption process to purify a vapor stream and thereby to produce a purified vapor stream. More particularly, the present invention relates to such a refrigeration method in which a heat transfer stream is liquefied against the vaporization of a liquid stream to in turn produce the vapor stream to be purified and is then re-vaporized against the liquefaction of the purified vapor stream.

Cryogenic temperature swing adsorption processes are utilized to purify streams of a variety of gaseous mixtures. They are so called "temperature swing" in that adsorption occurs at low temperatures and desorption from an adsorbent is at least initiated by heating the adsorbent. A very important application of such a cryogenic temperature swing adsorption process is in the purification of argon produced from an argon column of a cryogenic air separation plant. The argon produced from such a plant contains unacceptable levels of oxygen and nitrogen for many applications, but particularly, for those involved in the electronics industry. In order to produce argon at the requisite purity level, a stream of argon vapor from the argon column is sent to art adsorbent bed for purification. The adsorbent bed contains stages of Zeolite molecular sieve materials that are selected to preferentially adsorb oxygen and nitrogen and thereby cleanse the argon stream of nitrogen and oxygen impurities.

In order to have some continuity in production, two beds of adsorbent are operated out of phase. One of the beds, an on-line bed, receives the argon vapor to produce a purified argon product as a vapor stream. At the same time, the other of the beds, an off-line bed, is regenerated. Regeneration of the off-line bed is initiated by purging the bed with heated nitrogen. The passage of nitrogen through the bed heats the bed to initiate desorption and to remove residual oxygen from the bed. Thereafter, the continued flow of the nitrogen, which is ordinarily at ambient atmospheric temperature, cools the bed. The bed is then purged with all or part of the purified argon product from the on-line bed to remove the nitrogen. A point is reached at which all the nitrogen is removed and the argon flowing into the bed is serving to cool the off-line bed down for future service as an on-line bed. As is evident from this discussion, the production of a purified product is discontinuous in that all or part of that the purified argon product is contaminated with nitrogen during the purging of the off-line bed and hence, cannot be taken as a product. Thereafter, as the bed cools, full production of the purified argon product resumes, but the purified argon product has been heated by the off-line bed into a superheated state.

As can be appreciated, the purified argon product must be liquefied if it is to be stored. However, if the argon product being used for regeneration purposes is also to be stored, then the cooling duty of the liquefier will change because during regeneration of the off-line bed, the purified argon product will either not be taken and hence, there will be no refrigeration requirement, or the purified argon product will be in a highly superheated state as compared with the slightly superheated state of the argon product being produced from the on-line bed. Conventionally, liquefaction of the argon product is effected through use of a nitrogen stream taken from the high pressure column. However, the refrigeration demand and hence, the demand for the nitrogen stream varies with the particular phase of the temperature swing adsorption process. This in turn creates a cyclic loading on the air separation unit which is disadvantageous from both design control standpoints.

As will be discussed, the present invention provides a cryogenic refrigeration method that incorporates the variable capacity liquefaction necessary to liquefy a purified product produced by a temperature swing adsorption process without substantially changing the demand for a cryogenic refrigerant.

SUMMARY OF THE INVENTION

In accordance with the present invention, a cryogenic refrigeration method is disclosed for use in connection with a cryogenic temperature swing adsorption process. The cryogenic temperature swing adsorption process has a discontinuous production cycle during which production of a purified vapor stream is at least reduced through me of at least part of the purified vapor stream to purge a regenerating adsorption bed and the purified vapor stream is superheated through use of the purified vapor stream to cool the regenerating adsorption bed. The cryogenic refrigeration method comprises at least partially liquefying a heat transfer stream against vaporizing at least part of an impure liquid stream through indirect heat exchange to produce a process liquid from the heat transfer stream and an impure vapor stream from the impure liquid stream. The impure vapor stream is introduced into the cryogenic temperature swing adsorption process to produce the purified vapor stream and the purified vapor stream is then liquefied against vaporizing a mass flow rate of the process liquid through indirect heat exchange. During production of the purified vapor stream, the mass flow rate of the process liquid is formed from the liquefied heat transfer stream and a supplemental flow rate of a supplemental process liquid necessary to maintain thermodynamic equilibrium between the liquefactions of the heat transfer and purified vapor streams. Additionally, the mass flow rate of the process liquid is increased when the purified vapor stream is superheated. It is to be noted, that heat leakage, irreversibilities of practical heat exchangers, and the heat of adsorption all contribute to a refrigeration deficiency which is supplied by the supplemental process liquid. During reduction or cessation of the production of the purified vapor stream, the process liquid formed from the liquefied heat transfer stream is accumulated for later use in forming the mass flow rate of the process liquid.

A major difference between the present invention and the prior art is that a liquefied stream to be purified is utilized rather than a vapor stream. In applications of the present invention to argon purification, the argon produced as tower overhead in an argon column can either be taken as a liquid from the head condenser being used to generate column reflux or can be taken as a vapor, directly from the top of the column. Thus, the present invention would take argon liquid from the head condenser rather than argon vapor from the argon column. Additionally, the present invention takes advantage of the fact that temperature swing adsorption is not a continuous process in that there are periods of time in which no argon product is produced or production is reduced and therefore, the refrigeration of the liquid to be purified can be stored and in fact accumulated by liquefying a process stream, for instance, air or nitrogen. This accumulated refrigeration can then be applied to the excess refrigeration requirement in liquefying the purified vapor stream when the purified vapor stream is in a superheated state. At the same time, the liquid stream to be purified by a temperature swing adsorption process must be passed through the bed as a vapor so that utilizing a process stream to vaporize the liquid stream to be purified is essential in the first instance. To be sure, there will be a need for a flow of supplemental heat transfer fluid and this requirement can vary. However, depending on the particular application of the present invention, this requirement of supplemental heat transfer fluid can be supplied at a constant flow rate or even if required at a varying flow rate, the fluctuation has been found to be sufficiently small as not to cause any appreciable cyclic loadings on an air separation unit. This allows a cryogenic refrigeration method in accordance with the present invention to be easily adapted for integration into a cryogenic air separation plant.

A further advantage in the present invention is its simplicity. The refrigeration requirement produced from the process liquid can be accumulated and stored in a phase separation tank. Therefore, the present invention can be effected by supplying the requisite piping and a phase separation tank. This in practice is sufficiently inexpensive that recovery and storage of the purified vapor stream in accordance with the present invention can be accomplished in a very cost effective manner.

BRIEF DESCRIPTION OF THE DRAWING

Although the specification concludes with claims distinctly pointing out the subject matter that applicants regard as their invention, it is believed that the invention would be better understood when taken in conjunction with the accompanying sole FIGURE which is a schematic process flow diagram of a method in accordance with the present invention.

DETAILED DESCRIPTION

With reference to the sole FIGURE, an apparatus 10 is illustrated for carrying out a method in accordance with the present invention. For the sake of simplicity, the present invention will be discussed in relation to a cryogenic temperature swing adsorption process used in purifying a liquid argon stream produced in an argon column of the three column air separation plant. It is understood however, that the present invention would have application to any cryogenic temperature swing adsorption process in which cryogenic refrigeration is required.

A liquid argon stream 12 and a heat exchange stream 14 are introduced into two counter current passes 16 and 18 of a heat exchanger 20. Heat exchange stream 14 partially liquefies against vaporizing at least part of the liquid stream to thereby produce a process liquid flowing as a process liquid stream 22 and an impure vapor flowing as an impure vapor stream 24. It is to be noted that heat exchange stream 14 can be formed of nitrogen, air or other atmospheric gas.

Impure vapor stream 24 is purified within a conventional temperature swing adsorption unit 26 (hereinafter referred to as "TSA unit 26") to produce a purified vapor stream 28. Purified vapor stream 28 passes through an up-stream heat exchanger 30 and then a down stream heat exchanger 32. Aria passage through these heat exchangers, purified vapor stream is liquefied to produce a liquid product argon stream 34.

Although not illustrated, but as would be known to those skilled in the art, TSA unit 26 has two beds operating in an out of phase manner. Each bed has layers of CaX and 4A molecular sieve material. As described above, an on-stream bed generates an argon product stream having a reduced content of the oxygen and nitrogen. The off-stream bed is subjected to bed regeneration by first heating the bed with a nitrogen stream to initiate description and then continuing the passage of the nitrogen stream through the bed to purge residual oxygen from the bed. The bed is then cooled by nitrogen during a nitrogen cooling phase of the bed. Thereafter, the bed is purged with argon from the on-line bed. This argon upon entry to the bed is slightly superheated. It leaves the bed in what could be described as a fully superheated state. During this purging phase, the argon used in purging becomes contaminated with nitrogen and hence, it no longer can be taken as a product. However, a subsequent point is reached where the nitrogen content of the argon stream being removed from the bed is free of the nitrogen and therefore has a product level of purity. At such point, the argon stream is allowed to leave TSA unit 26 as purified vapor stream 28. Hence, there is a discontinuity in the production of purified vapor stream 28 during which the off-line bed is regenerated became the purified vapor stream 28 is used in whole or in part for such regeneration. It is in this discontinuity that the refrigeration of the incoming liquid argon is stored and accumulated. As could be appreciated the contaminated argon used in purging would be discharged from TSA unit 26.

Process liquid contained within process liquid stream 22 is utilized in liquefying purified vapor stream 28. Liquid process stream 22 is subjected to a joule-thompson expansion through an expansion valve 36 and then is flashed into a phase separation tank 38 to separate into liquid and gases phases 40 and 42, respectively. During a portion of the production phase of TSA unit 26, when purified liquid stream 28 is being directly taken from the on-line bed, a valve 44 is closed and process liquid, composed of liquid phase 40 and flowing as a first subsidiary process stream 46, is introduced into pass. 48 of heat exchanger 32 to liquify purified vapor stream 28.

During the off-line bed regeneration within TSA unit 26, at the point when production of purified vapor stream 28 ceases or is at least reduced, purified vapor is still being created in the on-line adsorbent bed. Hence, process liquid accumulates as liquid phase 40 within phase separation tank 38. When purified vapor stream 28 is again produced, it is superheated due to the cool down of the off-line bed of adsorbent. Therefore, an additional mass flow rate of process liquid is required to liquefy the superheated purified vapor stream 28. In order to effect this, valve 44 is opened and a second subsidiary process stream 50 through a pass 52 of up stream heat exchanger 30.

First and second subsidiary process streams 46 and 50 are vaporized within upstream and downstream heat exchangers 30 and 32 and subsequently, are passed :into a sensible heat exchanger 54 countercurrently with the incoming heat exchange stream. Sensible heat exchanger 54 is so named because it is used in "sensible heat" transfer, that is the heat required to cool down the heat exchange stream to a point just above: its liquefaction. Optionally, a vapor phase stream 56 is combined with vaporized first subsidiary process stream to form a combined stream 58 which is introduced into pass 60 of sensible heat exchanger 54. Vaporized second subsidiary process stream 50 is passed within another pass 62 of sensible heat exchanger 54 and incoming heat exchange stream 14 is passed through countercurrent pass 64 sensible heat exchanger 54. In an integrated unit in which apparatus 10 were integrated with an air separation plant, sensible heat exchanger 54 could be a part of the main heat exchanger of such air separation plant. Even in an integrated unit, a separate sensible heat exchanger could be used.

As mentioned above, there is never a sufficient amount of process liquid created to produce a sufficient mass flow rate to fully liquefy the impure vapor stream 28 because of heat leakage, thermodynamic irreversibility and etc. For this reason, a supplemental process liquid is added to phase separation tank 38 through supplemental process liquid stream 66. The supplemental process liquid has preferably the same or nearly the stone composition as heat exchange stream 14. As can be appreciated, it could have a different make up.

The following is a calculated example showing a practical operation of apparatus 10. The results of the example are for the sake of simplicity shown in chart form for the start of the three operational phases. The first phase is entitled "Adsorbing/Nitrogen Heating and Cooling Phase". During this phase, purified product stream 28 is produced from the on-line bed of TSA unit 26 while the off-line bed is being purged with nitrogen to remove oxygen and then cool the bed. The next phase, "Bed Regeneration—Argon Purge", is period of time in which the off-line bed is first being purged with part of the argon product and the last phase, "Argon Cooling" is when the argon product is cooling the off-line bed back down to cryogenic temperature and is being taken in the highly superheated state.

It can be seen in the foregoing chart that the mass flow rate of nitrogen being used in liquefying purified vapor stream 28 is supplied by first subsidiary stream 46 and thus, all liquefaction occurs within downstream heat exchanger 32. The refrigeration requirement is being supplemented by adding supplemental stream to phase separation tank 40. An additional point worth noting is that purified vapor stream is at a temperature of about 114.9944 K. and is slightly superheated because it is being directly taken from an on-line bed.

| Stream Number | Vapor Fraction | Temp (k) | Pressure (bar) | Flow (sm3/hr) | Nitrogen (mole fraction) | Argon (mole fraction) | Oxygen (mole fraction) |
|---|---|---|---|---|---|---|---|
| \multicolumn{8}{c}{ADSORBING/NITROGEN HEATING AND COOLING PHASE} |
| 24 | 1.0000 | 93.4629 | 1.8600 | 270.0000 | 0.0050000 | 0.9900000 | 0.0050000 |
| 12 | 0.000 | 93.3981 | 1.8600 | 270.0000 | 0.0050000 | 0.9900000 | 0.0050000 |
| 28 (Before Exchanger 30) | 1.0000 | 114.9944 | 1.7000 | 267.3000 | 0.0000000 | 1.0000000 | 0.0000000 |
| 28 (Before Exchanger 32) | 1.0000 | 114.9944 | 1.7000 | 267.2999 | 0.0000000 | 1.0000000 | 0.0000000 |
| 34 | 0.0000 | 91.8768 | 1.6000 | 267.2999 | 0.0000000 | 1.0000000 | 0.0000000 |
| 56 | 1.0000 | 88.8768 | 3.2896 | 30.5644 | 1.0000000 | 0.0000000 | 0.0000000 |
| 46 (After Exchanger 32) | 1.0000 | 95.0600 | 3.1896 | 343.3811 | 1.0000000 | 0.0000000 | 0.0000000 |
| 58 (Before Exchanger 54) | 1.0000 | 94.5299 | 3.1896 | 373.9455 | 1.0000000 | 0.0000000 | 0.0000000 |
| 58 (After Exchanger 54) | 1.0000 | 291.2195 | 3.0896 | 373.9455 | 1.0000000 | 0.0000000 | 0.0000000 |
| 50 (Before Exchanger 54) | 0.0041 | 88.5242 | 3.1896 | 0.001 | 1.0000000 | 0.0000000 | 0.0000000 |
| 50 (After Exchanger 54) | 1.0000 | 291.2195 | 3.0896 | 0.0001 | 1.0000000 | 0.0000000 | 0.0000000 |
| 14 (Before Exchanger 54) | 1.0000 | 302.0000 | 6.0000 | 351.9456 | 1.0000000 | 0.0000000 | 0.0000000 |
| 14 (Before Exchanger 20) | 1.0000 | 97.4625 | 5.9000 | 351.9456 | 1.0000000 | 0.0000000 | 0.0000000 |
| 22 | 0.0000 | 95.8726 | 5.8000 | 351.9456 | 1.0000000 | 0.0000000 | 0.0000000 |
| 66 | 0.0000 | 92.6085 | 4.5000 | 22.0000 | 1.0000000 | 0.0000000 | 0.0000000 |
| 22 (After J-T Valve 36) | 0.0841 | 88.8763 | 3.2896 | 351.9456 | 1.0000000 | 0.0000000 | 0.0000000 |
| Combined 22 and 66 | 0.0817 | 88.8768 | 3.2896 | 373.9456 | 1.0000000 | 0.0000000 | 0.0000000 |
| Combined 46 and 50 | 0.0000 | 88.8768 | 3.2896 | 343.3812 | 1.0000000 | 0.0000000 | 0.0000000 |
| 50 | 0.0000 | 88.8768 | 3.2896 | 0.0001 | 1.0000000 | 0.0000000 | 0.0000000 |
| 46 | 0.0000 | 88.8768 | 3.2896 | 343.3811 | 1.0000000 | 0.0000000 | 0.0000000 |

| | | | BED REGENERATION-ARGON PURGE | | | | |
|---|---|---|---|---|---|---|---|
| Stream Number | Vapor Fraction | Temp (k) | Pressure (bar) | Flow (sm3/hr) | Nitrogen (mole/frac) | Argon (mole/frac) | Oxygen (mole/frac) |
| 24 | 1.0000 | 93.4631 | 1.8600 | 270.0000 | 0.0050000 | 0.9900000 | 0.0050000 |
| 12 | 0.0000 | 93.3981 | 1.8600 | 270.0000 | 0.0050000 | 0.9900000 | 0.0050000 |
| 28 (Before Exchanger 30) | 1.0000 | 114.9935 | 1.7000 | 267.3000 | 0.0000000 | 1.0000000 | 0.0000000 |
| 28 (Before Exchanger 32) | 1.0000 | 114.9935 | 1.7000 | 66.8250 | 0.0000000 | 1.0000000 | 0.0000000 |
| 34 | 0.0000 | 91.8768 | 1.6000 | 66.8250 | 0.0000000 | 1.0000000 | 0.0000000 |
| 56 | 1.0000 | 88.8768 | 3.2896 | 29.5877 | 1.0000000 | 0.0000000 | 0.0000000 |
| 46 (After Exchanger 32) | 0.6137 | 88.5249 | 3.1896 | 146.3574 | 1.0000000 | 0.0000000 | 0.0000000 |
| 58 (Before Exchanger 54) | 0.6788 | 88.5269 | 3.1896 | 175.9451 | 1.0000000 | 0.0000000 | 0.0000000 |
| 58 (After Exchanger 54) | 1.0000 | 301.3126 | 3.0896 | 175.9451 | 1.0000000 | 0.0000000 | 0.0000000 |
| 50 (Before Exchanger 54) | 0.0041 | 88.5242 | 3.1896 | 0.0001 | 1.0000000 | 0.0000000 | 0.0000000 |
| 50 (After Exchanger 54) | 1.0000 | 301.3126 | 3.0896 | 0.00001 | 1.0000000 | 0.0000000 | 0.0000000 |
| 14 (Before Exchanger 54) | 1.0000 | 302.0000 | 6.0000 | 351.9452 | 1.0000000 | 0.0000000 | 0.0000000 |
| 14 (Before Exchanger 20) | 1.0000 | 97.4627 | 5.9000 | 351.9452 | 1.0000000 | 0.0000000 | 0.0000000 |
| 22 | 0.0000 | 95.8726 | 5.8000 | 351.9452 | 1.0000000 | 0.0000000 | 0.0000000 |
| 66 | 0.0000 | 92.6085 | 4.5000 | 0.0000 | 1.0000000 | 0.0000000 | 0.0000000 |
| 22 (After J-T Valve 36) | 0.0841 | 88.8763 | 3.2896 | 351.9452 | 1.0000000 | 0.0000000 | 0.0000000 |
| Combined 22 and 66 | 0.0841 | 88.8768 | 3.2896 | 373.9454 | 1.0000000 | 0.0000000 | 0.0000000 |
| Combined 46 and 50 | 0.0000 | 88.8768 | 3.2896 | 146.3574 | 1.0000000 | 0.0000000 | 0.0000000 |
| 50 | 0.0000 | 88.8768 | 3.2896 | 0.0001 | 1.0000000 | 0.0000000 | 0.0000000 |
| 46 | 0.0000 | 88.8768 | 3.2896 | 146.3574 | 1.0000000 | 0.0000000 | 0.0000000 |

During the "Bed Regeneration—Argon Purge" phase, the flow of supplemental heat exchange stream 66 is shut off. Additionally, the flow of argon product stream 34 is reduced as is the mass flow rate of first subsidiary stream 46. This allows heat transfer liquid to accumulate within phase separation tank 40.

| | | | ARGON COOLING | | | | |
|---|---|---|---|---|---|---|---|
| Stream Number | Vapor Fraction | Temp (k) | Pressure (bar) | Flow (sm3/hr) | Nitrogen (mole fraction) | Argon (mole fraction) | Oxygen (mole fraction) |
| 24 | 1.0000 | 93.4629 | 1.8600 | 270.0000 | 0.0050000 | 0.9900000 | 0.0050000 |
| 12 | 0.0000 | 93.3981 | 1.8600 | 270.0000 | 0.0050000 | 0.9900000 | 0.0050000 |
| 28 (Before Exchanger 30) | 1.0000 | 233.00 | 1.7000 | 267.3000 | 0.0000000 | 1.0000000 | 0.0000000 |
| 28 (Before Exchanger 32) | 1.0000 | 105.4629 | 1.7000 | 267.3000 | 0.0000000 | 1.0000000 | 0.0000000 |
| 34 | 0.0000 | 91.8768 | 1.6000 | 267.3000 | 0.0000000 | 1.0000000 | 0.0000000 |
| 56 | 1.0000 | 88.8768 | 3.2896 | 33.7163 | 1.0000000 | 0.0000000 | 0.0000000 |
| 46 (After Exchanger 32) | 1.0000 | 94.4383 | 3.1896 | 334.0292 | 1.0000000 | 0.0000000 | 0.0000000 |
| 58 (Before Exchanger 54) | 1.0000 | 93.9006 | 3.1896 | 367.7455 | 1.0000000 | 0.0000000 | 0.0000000 |
| 58 (After Exchanger 54) | 1.0000 | 282.9118 | 3.0896 | 367.7455 | 1.0000000 | 0.0000000 | 0.0000000 |
| 50 (Before Exchanger 54) | 1.0000 | 230.7257 | 3.1896 | 77.2000 | 1.0000000 | 0.0000000 | 0.0000000 |
| 50 (After Exchanger 54) | 1.0000 | 282.9118 | 3.0896 | 0.0001 | 1.0000000 | 0.0000000 | 0.0000000 |
| 14 (Before Exchanger 54) | 1.0000 | 302.0000 | 6.0000 | 351.9456 | 1.0000000 | 0.0000000 | 0.0000000 |
| 14 (Before Exchanger 20) | 1.0000 | 97.4625 | 5.9000 | 351.9456 | 1.0000000 | 0.0000000 | 0.0000000 |
| 22 | 0.0000 | 95.8726 | 5.8000 | 351.9456 | 1.0000000 | 0.0000000 | 0.0000000 |
| 66 | 0.0000 | 92.6085 | 4.5000 | 93.0000 | 1.0000000 | 0.0000000 | 0.0000000 |
| 22 (After J-T Valve 36) | 0.0841 | 88.8763 | 3.2896 | 351.9456 | 1.0000000 | 0.0000000 | 0.0000000 |
| Combined 22 | 0.0758 | 88.8768 | 3.2896 | 444.9456 | 1.0000000 | 0.0000000 | 0.0000000 |

| | | | ARGON COOLING | | | | |
|---|---|---|---|---|---|---|---|
| Stream Number | Vapor Fraction | Temp (k) | Pressure (bar) | Flow (sm3/hr) | Nitrogen (mole fraction) | Argon (mole fraction) | Oxygen (mole fraction) |
| and 66 Combined 46 and 50 | 0.0000 | 88.8768 | 3.2896 | 411.2292 | 1.0000000 | 0.0000000 | 0.0000000 |
| 50 | 0.0000 | 88.8768 | 3.2896 | 77.2000 | 1.0000000 | 0.0000000 | 0.0000000 |
| 46 | 0.0000 | 88.8768 | 3.2896 | 343.3811 | 1.0000000 | 0.0000000 | 0.0000000 |

At the start of the "Argon Cooling" phase, purified vapor stream is highly superheated and has a temperature of about 233.00 K. Also, the mass flow rate of heat transfer liquid is increased by adding flow to form second subsidiary stream 50. As such, sensible heat is removed in upstream heat exchanger 30 and full liquefaction occurs in downstream heat exchanger 32. The mass flow rate of supplemental heat exchange stream is also increased to add sufficient refrigeration to liquefy purified vapor stream 28.

While the invention has been described with reference to a preferred embodiment, it will be understood by those skilled in the art that various modification, additions, and omission can be made without departing from the spirit and scope of the present invention.

We claim:

1. A cryogenic refrigeration method for use in connection with a cryogenic temperature swing adsorption process having a discontinuous production cycle during which production of a purified vapor stream is at least reduced through use of at least part of the purified vapor stream to purge a regenerating adsorption bed and the purified vapor stream is superheated through use of the purified vapor stream to cool the regenerating adsorption bed after having been purged, said cryogenic refrigeration method comprising:

a) at least partially liquefying a heat exchange stream against vaporizing at least part of an impure liquid stream through indirect heat exchange to produce a process liquid from said heat exchange stream and an impure vapor stream from said liquid stream;

b) introducing said impure vapor stream into said cryogenic temperature swing adsorption process to produce said purified vapor stream;

c) liquefying said purified vapor stream from said cryogenic temperature swing adsorption process against vaporizing a mass flow rate of the process liquid through indirect heat exchange;

d) during production of the purified vapor stream, forming the mass flow rate of the process liquid from the liquefied heat exchange stream and a supplemental flow rate of a supplemental process liquid necessary to maintain thermodynamic equilibrium between the liquefactions of the heat transfer and purified vapor streams and increasing the mass flow rate of the process liquid when said purified vapor stream is superheated; and e) during cessation or reduction of the production of the purified vapor stream, accumulating the process liquid formed from the liquefied heat exchange stream for later use in forming the mass flow rate of the process liquid during production of the purified vapor stream.

2. The method of claim 1, wherein the process liquid formed from liquefaction of the heat exchange stream and the supplemental process liquid have essentially the same composition.

3. The method of claim 1 or claim 2, wherein:

said heat exchange stream is subjected to a joule-thompson expansion and then flashed into a phase separation tank to create liquid and vapor phases of said heat exchange stream;

said mass flow rate of said process liquid is removed from a bottom portion of said phase separation tank; and said process liquid is accumulated within said phase separation tank.

4. The method of claim 3, wherein said mass flow rate of said process liquid comprises a first subsidiary process stream composed of said process liquid and also, a second subsidiary process stream to supply the increase in said mass flow rate of said process liquid when said purified vapor stream is superheated.

5. The method of claim 4, wherein:

said first and second subsidiary process streams after having been used in liquefying said purified vapor stream are introduced into a heat exchanger and brought into indirect heat exchange with said heat exchange stream so that sensible heat is removed from said heat exchange stream; and after passing through said heat exchanger, said heat exchange stream and said liquid stream are passed countercurrently through a liquefier to liquefy said heat exchange stream.

6. The method of claim 5, wherein a vapor phase stream is removed from said phase separation tank and combined with said second subsidiary process stream before said heat exchanger 7. The method of claim 5, wherein said first subsidiary process stream is passed into indirect heat exchange with said purified vapor stream in a downstream heat exchanger and said second subsidiary process stream is passed into indirect heat exchange with said purified vapor stream in an upstream heat exchanger located upstream of said downstream heat exchanger.

8. The method of claim 7, wherein a vapor phase stream is removed from said phase separation tank and combined with said second subsidiary process stream before said heat exchanger.

9. The method of claim 5, wherein said heat exchange stream comprises nitrogen.

10. The method of claim 5, wherein said heat exchange stream comprises air.

11. The method of claim 10, wherein said heat exchanger comprises the main heat exchanger of a cryogenic air separation plant and said heat exchange stream and said impure liquid stream are passed countercurrently through said main heat exchanger.

12. The method of claim 5, wherein said impure liquid stream is an argon containing stream and said purified vapor stream substantially comprises argon.

* * * * *